United States Patent [19]

Nicholls et al.

[11] 3,979,249

[45] Sept. 7, 1976

[54] TIRE BUILDING APPARATUS

[75] Inventors: Ernest George Nicholls, Balsall Common, near Coventry; Bernard Charles Allitt, Sutton Coldfield, both of England

[73] Assignee: Dunlop Limited, London, England

[22] Filed: Aug. 20, 1974

[21] Appl. No.: 498,935

Related U.S. Application Data

[63] Continuation-in-part of Ser. No. 259,151, June 2, 1972, abandoned.

[30] Foreign Application Priority Data

June 10, 1971 United Kingdom................ 19818/71

[52] U.S. Cl............................. 156/416; 156/128 R
[51] Int. Cl.².................................... B29H 17/16
[58] Field of Search................ 156/128, 128 I, 416, 156/123, 126–130, 132, 133, 394

[56] References Cited

UNITED STATES PATENTS

| 2,084,009 | 6/1937 | Sohl..................................... 156/416 |
| 2,814,331 | 11/1957 | Vanzo et al.......................... 156/416 |
| 3,018,213 | 1/1942 | Kraft.................................... 156/416 |
| 3,138,510 | 6/1964 | Hindin et al....................... 156/416 X |
| 3,265,549 | 8/1966 | Woodhall et al................... 156/416 |
| 3,547,734 | 12/1970 | Read.................................... 156/416 |

FOREIGN PATENTS OR APPLICATIONS 1,000,262   8/1965   United Kingdom................. 156/416

Primary Examiner—Douglas J. Drummond
Assistant Examiner—John E. Kittle
Attorney, Agent, or Firm—Stevens, Davis, Miller & Mosher

[57]   ABSTRACT

An inflatable shaping bag or diaphragm for a tire building or shaping former. The bag is based on an elastomeric sheet radially expansible but has high lateral bending stiffness in part of its width owing to the presence of at least one pair of reinforcements of inextensible reinforcing elements, each element lying in a plane containing the axis of the bag. The reinforcement can consist, for example, of two layers of parallel steel cords, spaced apart by a layer of rubber.

12 Claims, 2 Drawing Figures

TIRE BUILDING APPARATUS

This application is a continuation in part of my prior U.S. application No. 259,151 filed on June 2, 1972, now abandoned.

This invention relates to tire building apparatus and, more particularly to a shaping bag or diaphragm for a tire building or shaping former.

According to the present invention an inflatable shaping bag or diaphragm for a tire building or shaping former which is expansible in a radial direction to effectively increase the diameter of at least a portion thereof to a substantially toroidal configuration comprises a flexible elastomeric sheet material and, in at least one circumferentially extending region, a means for reinforcing said region to have a high lateral bending stiffness while remaining radially expansible, said means comprising at least one pair of layers of substantially inextensible reinforcing elements lying in planes including the axis of the bag or diaphragm, the layers of each pair being radially spaced apart and separated from one another by a layer of elastomeric material thereby creating a beam-like structure having a high lateral bending stiffness.

The reinforcing elements may for example be hollow centered members, e.g. tubes, or strips of a rigid material, e.g. steel, of greater depth than width disposed side by side as a layer in a region forming a band around the diaphragm, the depth of the strips e.g. ¼ inch giving the strips a high stiffness in the plane containing the axis of the bag or diaphragm while the low width, e.g. 1/16 inch, and the thickness of rubber between the strips allows the layer to be expanded. Alternatively cords may be provided extending across the diaphragm and a tube or tubes slid over the cords to act as the reinforcing elements, the position and length of the tubes being adjusted to achieve lateral bending stiffness in the desired region.

The layers preferably comprise steel cords or wires extending laterally of the diaphragm although other reinforcing elements e.g. glass fiber cords, or carbon fiber cords, may be used if desired.

The region containing the reinforcing elements is preferably the center or "crown" region of the bag or diaphragm, the axial width of the reinforcing elements being no greater than the axial width of a breaker layer of a tire to be shaped thereon; or one or both of the laterally outer regions thereof. Alternatively, reinforcing elements may be provided in various desired regions separated by laterally flexible regions to achieve a desired cross-sectional shape when the bag or diaphragm is inflated. The laterally flexible regions may consist of unreinforced elastomer or may contain layers of flexible reinforcing elements which are not spaced-apart.

A shaping diaphragm in accordance with the invention can be provided with a central valve through which air can be blown to break vacuum seals which may form between the diaphragm and a tire during shaping.

The elastomeric sheet material will generally be a vulcanized rubber, preferably a rubber which can be stripped readily from an unvulcanized tire cover, and may additionally contain one or more plies of further reinforcing elements, e.g. textile cords.

A method of manufacturing of a tire containing a rigid breaker assembly of substantially flat profile can comprise assembling a tire carcass on a former having a shaping bag or diaphragm according to claim 1 in which the crown region of the bag has a high lateral bending stiffness, inflating said bag to shape the tire carcass and applying the breaker assembly to the crown region of the shaped carcass while said region is supported by the crown region of the inflated shaping bag.

A rigid breaker assembly may for example be a steel cord breaker and the tire may suitably be a radial ply tire having a textile or steel cord reinforced carcass.

An inflatable shaping bag in accordance with the invention will now be described in more detail, by way of example only, with reference to the accompanying drawings in which.

Figure 1:
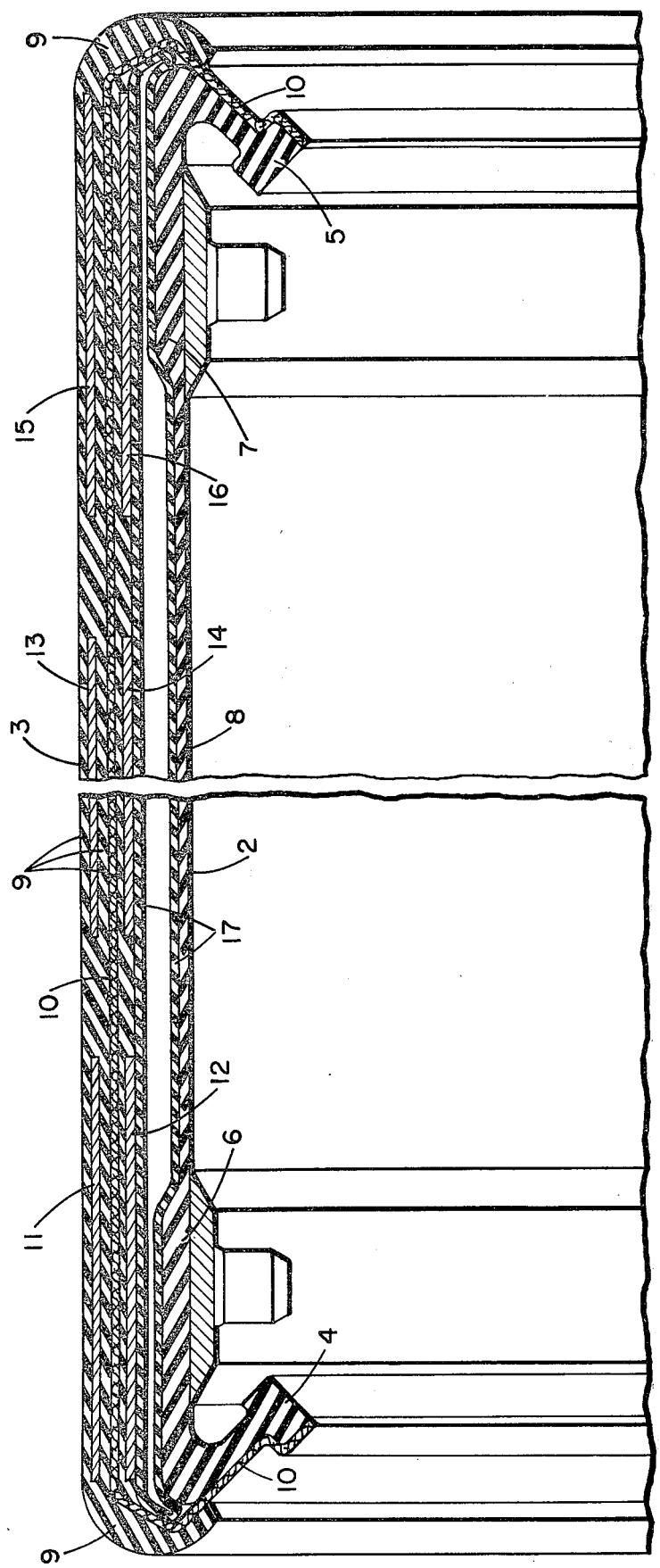
FIG. 1 shows the bag in section in the uninflated state.

The bag consists of an inner portion 2, an outer portion 3, and a pair of annular rubber beads 4 and 5 which are shaped to be held by the supporting structure of a generally cylindrical tire building former (not shown).

The inner portion 2 of the bag is made of rubber and consists of thick laterally outer sections 6 and 7 and a thinner central section 8.

The outer portion 3 of the bag consists of a sheet of rubber 9 having embedded in it a single textile reinforcing ply 10 which extends from bead to bead and three pairs of layers 11 and 12, 13 and 14 and 15 and 16 each layer consisting of steel cords extending in a lateral direction with respect to the bag as a whole. The layers 11, 13 and 15 are spaced apart from the respective layers 12, 14 and 16 the space between the layers containing rubber and the reinforcing ply 10.

The pairs of layers 11 and 12 and 15 and 16 are located in the laterally outer regions of the bag and the pair of layers 13 and 14 is located across the center or "crown" region of the drum; the gaps between the layers are filled with rubber.

The bag also contains an inner liner 17 of air-impermeable rubber.

Figure 2:
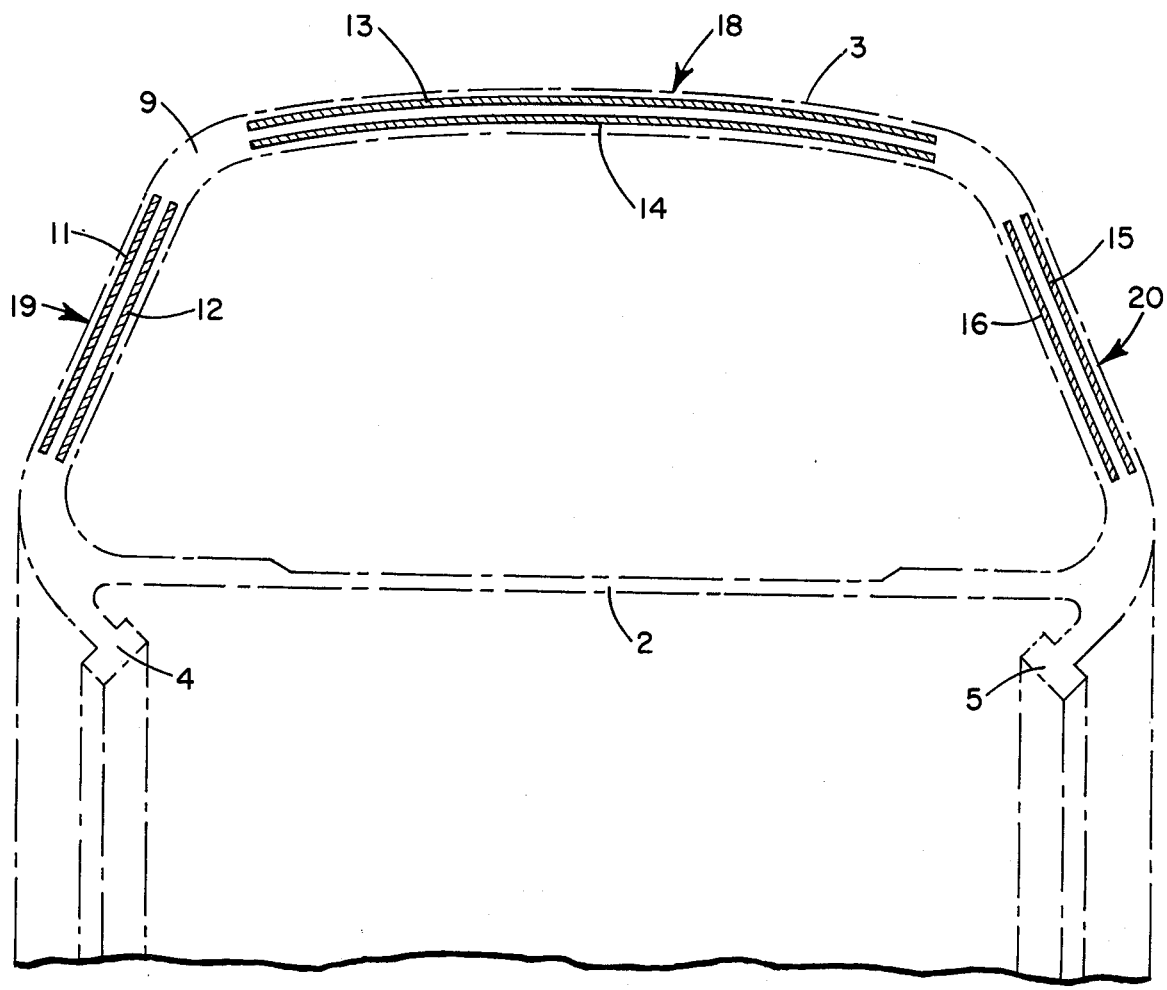
FIG. 2 shows the cross-sectional profile of the bag in the inflated state.

When the bag is inflated the bead portions 4 and 5 are moved laterally inwards and it assumes the profile shown in FIG. 2 having a substantially flat crown region 18, and flat sidewall regions 19 and 20 the lateral orientation of the steel cords in the layers 11, 12, 13, 14, 15, and 16 permitting radial expansion of the outer portion of the bag by stretching of the rubber between the cords. Thus in the inflated bag the spacing between the cords in the layers 13 and 14 is increased substantially uniformly whereas in the layers 11 and 12; 15 and 16 the laterally inner ends, which become the radially outer ends of the cords when the bag is inflated, are more widely spaced than the laterally outer ends of the cords. The spaced-apart relationship of the pairs of steel cord layers, with substantially incompressible rubber in the space, causes the pairs of layers to act as beams giving high lateral stiffness so that the regions of the bag containing these layers remain substantially flat on inflation.

In the use of the bag in the manufacture of a tire the tire carcass is built up as a cylinder on the outer surface of the bag which is collapsed on the supporting structure of the building former. The bag is inflated to shape the tire carcass, the flat crown of the inflated bag permitting a breaker assembly then to be applied to the carcass without distortion.

The layer of elastomeric material disposed between the pairs of layers is substantially thicker than the thickness of one of the layers and is preferably several times thicker. For example, in shaping bags or diaphragms (similar to that shown in FIG. 1) of sizes suitable for shaping car tire carcasses, one pair of reinforcing elements is provided in the central region of the bag or diaphragm, the elements having an axial width no greater than the width of the breaker layer of the tire to be shaped thereon. The reinforcing layers each comprise calendered steel wire cord fabric, the diameter of the individual cords being 0.91 mm and the layer of rubber between said layer, inclusive of the thickness of the layer 10 if present, being 5.69 mm, thus resulting in a reinforcing layer thickness to elastomer layer thickness ratio of approximately 1 to 6. However, it will be apparent that other ratios will fall within the scope of the present invention.

The invention has been described above by reference to a shaping bag but the invention is equally applicable to a shaping diaphragm which is similar in construction to the bag described above except that the radially inner portion of the bag is omitted.

The shaped bag or diaphragm provided by the present invention enables a tire containing rigid breaker assembly of substantially flat profile, e.g. a steel cord breaker, to be built on a comparatively simple inexpensive building former. Hitherto such a method of building has been possible only with extremely complex building formers which are many times more expensive than that provided in the invention.

Having now described our invention what we claim is:

1. An inflatable shaping bag or diaphragm for a tire building or shaping former which is expansible in a radial direction to effectively increase the diameter of at least a portion thereof to a substantially toroidal configuration comprising a flexible elastomeric sheet material and, in at least one circumferentially extending region, a means for reinforcing said region to have a high lateral bending stiffness while remaining radially expansible, said means comprising at least one pair of layers of substantially inextensible reinforcing elements lying in planes including the axis of the bag or diaphragm said elements providing a high stiffness in said planes, the layers of each pair being radially spaced apart and separated from one another by a layer of elastomeric material thereby creating a beam-like structure having a high lateral bending stiffness resulting in the outside shape of the bag or diaphragm in said planes being substantially flat in said reinforced regions.

2. A bag or diaphragm according to claim 1 in which the reinforcement is strips of rigid material of greater depth than width disposed side by side as a layer in a region forming a band round the diaphragm, the depth of the strips giving the strips a high stiffness in the plane containing the axis of the bag or diaphragm while the lower width of the strips and thickness of rubber between the strips allows the layer to be expanded.

3. A bag or diaphragm according to claim 1 in which the reinforcing elements are tubes.

4. A bag or diaphragm according to claim 3 in which the tubes are located about cords extending across the diaphragm.

5. A bag or diaphragm according to claim 1 in which the reinforcement comprises steel cords or wires extending laterally of the diaphragm.

6. A bag or diaphragm according to claim 1 in which the region containing the reinforcement is the center or crown region of the bag or diaphragm.

7. A bag or diaphragm according to claim 6 wherein the axial width of the reinforcement is no greater than the axial width of a breaker layer of a tire to be shaped thereon.

8. A bag or diaphragm according to claim 6 in which one or both of the laterally outer regions thereof also contain the reinforcement.

9. A bag or diaphragm according to claim 1 in which the reinforcement comprises a plurality of pairs of layers separated by laterally flexible regions to achieve a desired cross-sectional shape when the bag or diaphragm is inflated.

10. A bag or diaphragm according to claim 9 in which lateral flexible regions consist of unreinforced elastomer.

11. A bag or diaphragm according to claim 9 in which the laterally flexible regions contain layers of flexible reinforcing elements which are not spaced apart.

12. A bag or diaphragm according to claim 1 which included at least one ply of additional reinforcing elements which are flexible.

* * * * *